United States Patent [19]  
Jones

[11] Patent Number: 5,060,553  
[45] Date of Patent: Oct. 29, 1991

[54] ARMOR MATERIALS
[75] Inventor: Ronald W. Jones, Market Harborough, United Kingdom
[73] Assignee: Ceramic Developments (Midlands) Limited, England
[21] Appl. No.: 474,080
[22] PCT Filed: Nov. 10, 1987
[86] PCT. No.: PCT/GB87/00801
§ 371 Date: May 7, 1990
§ 102(e) Date: May 7, 1990
[87] PCT Pub. No.: WO89/04452
PCT Pub. Date: May. 18, 1989
[51] Int. Cl.$^5$ .............................................. F41H 5/04
[52] U.S. Cl. .................................... 89/36.02; 428/911
[58] Field of Search ......................... 89/36.02; 109/80; 428/911

[56] References Cited
U.S. PATENT DOCUMENTS

| | | | |
|---|---|---|---|
| 3,444,033 | 5/1969 | King | 89/36.02 |
| 3,671,374 | 6/1972 | Kolarik | 428/911 |
| 4,310,595 | 1/1982 | Beall et al. | 428/332 |
| 4,473,653 | 9/1984 | Rudoi | 501/4 |
| 4,633,756 | 1/1987 | Rudoi | 89/36.02 |
| 4,739,690 | 4/1988 | Moskowitz | 89/36.02 |

FOREIGN PATENT DOCUMENTS

| | | |
|---|---|---|
| 957191 | 5/1964 | United Kingdom . |
| 1015068 | 12/1965 | United Kingdom . |
| 1105433 | 3/1968 | United Kingdom . |
| 2172282 | 9/1986 | United Kingdom . |

Primary Examiner—Stephen C. Bentley  
Attorney, Agent, or Firm—Klauber & Jackson

[57] ABSTRACT

An armor material for use in protecting personnel and instrumentation from ball round, armor piercing bullets and shrapnel, comprises a glass-ceramic bonded to an energy absorptive backing comprising high tensile fibers embedded in a natural or synthetic polymer. The glass-ceramic is subjected to controlled crystallization by heat treatment to promote optimum ballistic properties which are equal to or better than those of alumina despite the lower density and hardness of the glass-ceramic material.

6 Claims, 1 Drawing Sheet

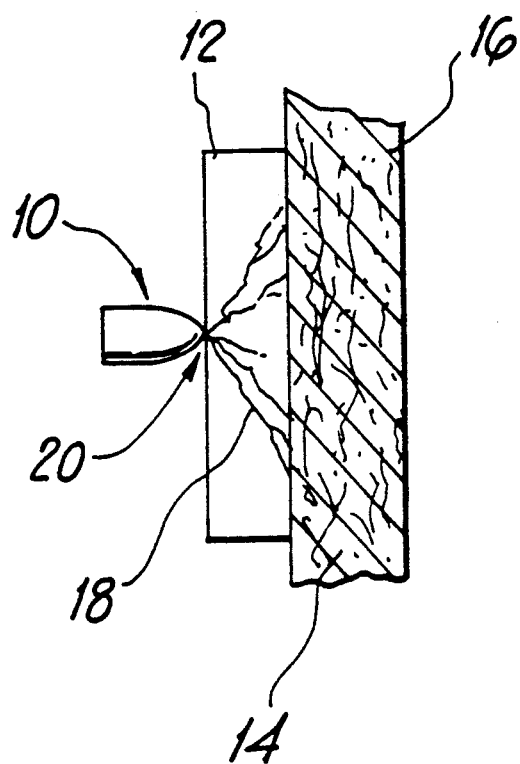

ARMOR MATERIALS

This invention relates to armour materials, for example the type of armor used to protect personnel and instrumentation from ball round, armor piercing bullets and shrapnel. Such armor is either worn by personnel or used in the structure of a vehicle, helicopter or aircraft, such as in door panels or in the lining of a pilot's seat.

The prior art includes proposals for armor materials in which tiles of aluminium oxide or alumina are bonded on to an energy absorptive backing. The priniciple of operation of this prior art system is complex and not fully understood, but the generally accepted theory is that, in use, a ballistic projectile strikes the ceramic tile, and in transferring kinetic energy to this relatively dense and hard material, establishes shock waves in the tile which lead to multiple fractures in the ceramic material.

This prior art armor material has various shortcomings including the fact that it is somewhat heavy. The alumina ceramic material makes a significant contribution to the overall weight of the composite armor material, having a density in the range 3.4 to $3.9 \times 10^3$ kg/m$^3$. These qualities of relatively high density and hardness have been seen as an inevitable feature of a material which has to absorb the kinetic energy of a projectile by fragmentation, though there is of course a need (particularly in the aircraft industry) for a material which is lighter and preferably is softer and easier to machine and cut.

We have discovered that there is a range of materials which posses densities lower than $3.4 \times 10^3$ kg/m$^3$ yet which perform equally or better than alumina (on a weight/threat basis) in terms of preventing ballistic projectiles penetrating composite armor incorporating same, and despite having a hardness significantly less than alumina, the Vickers hardness numbers actually being one half to one third of that of alumina.

According to the invention there is provided an armor material as defined in the accompanying claims. The invention also provides a method of making an armor layer for use in such an armor material.

In an embodiment described below, a glass ceramic composition is produced by controlled crystallisation of a corresponding glass by heat treatment, thereby to promote during use in an armor material, multiple fracturing upon impact by a ballistic projectile.

The method of heat treatment comprises:

(a) maintaining the glass for up to 10 hours at a nucleation temperature which can be determined for the material in question by thermal analysis and/or electron microscopy, at which temperature nuclei form within the body of the glass; and (b) raising the temperature from the nucleation temperature to a crystallisation temperature which is preferably somewhat below the temperature for maximum rate of crystal formation by an amount such as to produce a higher density of fine grain crystals than would be obtained at the said temperature for maximum rate of crystal formation; and (c) maintaining the temperature at the crystallisation temperature for up to 10 hours; and (d) cooling the glass ceramic at a rate such as to avoid undue residual stress, for example by cooling at the natural cooling rate of a kiln containing the glass ceramic.

The heat treatment step in the production of armor materials according to the invention has the effect of maximising, or at least significantly increasing, the velocity of sound in the material. We have discovered that this parameter is directly linked to the optimisation of the ballistic performance of an armor material, which is somewhat unexpected having regard to the above-mentioned prior art theories of operation of materials of this kind.

From the foregoing it will be understood that the ballistic properties of an armor material according to the invention are related to the velocity of sound therein, which in turn is related to the ratio of the square root of its elastic modulus to its density and thus is not connected to the hardness of the material in a simple direct way. The heat treatment process forming part of the method of the invention enables controlled crystallisation to be achieved in a manner achieving good ballistic performance. Such performance is preferably tested by ballistic experiments for any particular glass composition and threat.

The accompanying drawing shows a section through a composite armor material at the moment that it is struck by a projectile.

In the drawing, projectile 10 has just made impact with the glass-ceramic layer 12, which is bonded over its face 14 to an energy-absorptive layer 16 comprising a synthetic resin having embedded therein fibers of high tensile strength such as glass, KEVLAR, or carbon fiber.

As shown in the drawing, glass-ceramic layer 12 has produced a conical fracture 18 radiating from the point of contact 20. This has the effect of transferring kinetic energy to the ceramic debris over an area much greater than that of the bullet. As the bullet continues, it is itself actually broken into very fine pieces of metal debris by the broken particles of glass-ceramic which remain in place bonded to the backing material. This fine debris from the projectile and tile is absorbed in the backing material 16 which deforms and often delaminates. In this way, the kinetic energy of the bullet is absorbed and causes the minimum of damage to personnel and instruments as compared with its effect when the bullet penetrates a backing and passing through it.

Production of tiles 12 for bonding to a backing layer 16 will now be described.

The tiles and suitable shaped articles formed of the glass ceramic material, may be produced by conventional glass-melting and forming operations. For this purpose, the glass is melted in a tank or crucible and fed by a suitable method into press moulds. The material is pressed to the required thickness and then removed from the mould and introduced into a kiln for heat treatment to produce controlled crystallisation in the manner described above. After the heat treatment, the tile or other shaped body is cooled to room temperature.

Alternatively, some of the glass compositions can be annealed down to room temperature after forming, and the heat treatment and crystallisation step can be performed later. If this procedure is followed the tile or article can be diamond machined to a preferred shape, or even hot-formed to a desired shape, by further pressing, draping, or vacuum drawing. This enables complex double radius of curvature shapes to be made, such as breastplate armor. After the shaping steps, the tiles or shaped articles are then subjected to heat treatment as described above, to produce controlled crystallisation.

Alternatively, the articles could be subjected to the heat treatment and crystallisation step directly after hot forming and pressing, without an intermediate cooling stage.

Further methods of forming uniform sheet of the glass-ceramic material include drawing and rolling continuous sheet from the melt by a method such as Fourcoult vertical rolling or floating the ribbon of glass on molten tin. In most cases it is advisable to take the continuous sheet directly through the crystallisation heat treatment, but some compositions can be subjected to an intermediate cooling stage, by annealing down, and then subsequently heat treating.

Some glass-ceramic compositions are very refractory and have temperature/viscosity relationships which make melt forming difficult. These compositions can be produced as frit, ground to powder and then pressed and sintered, or hot pressed, followed by the necessary heat treatment steps as defined above, in order to produce controlled crystallisation and optimum ballistic properties.

Glass compositions which can be heat treated to produce controlled crystallisation and thus to yield glass ceramic compositions according to the invention, having improved ballistic properties, include the following:

1. Lithium zinc silicates.
2. Lithium alumino silicates.
3. Lithium zinc alumino silicates.
4. Lithium magnesium silicates.
5. Lithium magnesium alumino silicates.
6. Magnesium alumino silicates.
7. Calcium magnesium alumino silicates.
8. Magnesium zinc silicates.
9. Calcium magnesium zinc silicates.
10. Zinc alumino silicates.
11. Calcium phosphates.
12. Calcium silico phosphates.
13. Barium silicate.

Additions to these compositions can be made to control the microstructure of the glass-ceramic, and thus to promote the achievement of optimum ballistic properties. These additions include:

$B_2O_3$, $Na_2O$, $K_2O$, $P_2O_5$, $CeO_2$, $TiO_2$, $ZrO_2$, $WO_3$, $Cr_2O_3$, $Fe_2O_3$, $Fe_3O_4$, $As_4O_6$, $Sb_4O_6$, $MoO_3$, $BaO$, $SrO$.

The method of melting the composition to introduce the additional material depends upon the particular glass system in question. If the glass is conductive or if it can be doped to render it conductive at elevated temperatures, then the best and most consistent results are obtained by joule effect melting. Here the glass or batch is first preheated with radiant heat to develop conductivity, then the melting process is maintained by passing an electric current through the glass via electrodes immersed in the melt. In the majority of compositions, molybdenum is chosen as the electrode material, since its slight dissolution into the glass causes no deleterious effect on the microstructure of the glass-ceramic. Other electrodes such as stannic oxide, iron, platinum or carbon can be used in certain cases. By using this method, it is also possible to run a tank furnace with a cold top. In cold top operation, a cold batch blanket is maintained over the molten glass. This prevents volatilisation of materials such as $Li_2O$, $B_2O_3$, and $P_2O_5$, the loss of which has a pronounced effect on the microstructure and the properties of the glass-ceramic.

Four specific examples of glass-ceramic compositions which have satisfactory properties in relation to ballistic projectiles, namely 'ball round', when employed in a composite structure with an energy-absorptive backing as described above, will now be described.

EXAMPLE 1

LITHIUM ZINC ALUMINO SILICATE

| Glass composition | Wt % |
| --- | --- |
| Silica | 72 |
| Lithia | 10 |
| Zinc oxide | 5 |
| Alumina | 7 |

To this glass, various additions of the following can be made to make up the balance of one hundred, in the following proportions:

| Addition | Wt % |
| --- | --- |
| Sodium Oxide | 0.1–5 |
| Potassium Oxide | 0.1–6 |
| Phosphorus Pentoxide | 0.5–5 |
| Ceric Oxide | 0.1–3 |
| Iron Oxide | 0.1–2 |

In a particular embodiment, the following composition was adopted:

| | |
| --- | --- |
| $SiO_2$ | 72 |
| $Li_2O$ | 10 |
| $ZnO$ | 5 |
| $K_2O$ | 3.0 |
| $Al_2O_3$ | 7.4 |
| $P_2O_5$ | 2.4 |
| $Fe_2O_3$ | 0.2 |

This composition had a density of $2.45 \times 10^3$ kg/m$^3$, and a hardness of $580 \pm 5$ Knoop and a 4 point bend strength of 220 MPa and an elastic modulus of 104 GPa.

Heat treatment of this composition to produce controlled crystallisation was carried out as follows.

A tile of the material was charged into a kiln at a nucleation temperature of 548 degrees centigrade. The tile was held at this nucleation temperature for between 1 and 8 hours. The temperature of the kiln was then raised at 4 degrees centigrade per minute to 855 degrees centigrade, which is the temperature for controlled crystallisation. This latter temperature was held for 1 hour, after which the tile is cooled at the natural rate of the kiln.

EXAMPLE 2

LITHIUM ALUMINO SILICATE

| Glass composition | Wt % |
| --- | --- |
| Silica | 71.0 |
| Lithia | 12.0 |
| Alumina | 13.0 |

Additions of various materials were made to optimise ballistic properties. In this example, the composition was electromelted and the following composition was obtained:

| Glass composition | Wt % |
| --- | --- |
| $SiO_2$ | 71 |
| $Li_2O$ | 12.0 |

-continued

| Glass composition | Wt % |
| --- | --- |
| $Al_2O_3$ | 13 |
| $P_2O_5$ | 2.5 |
| $CeO_2$ | 1.0 |
| $Fe_2O_3$ | 1.0 |
| BaO | 0.5 |

The composition had a density of $2.4 \times 10^3$ kg/m$^3$ and a hardness of 535±5 Knoop and a 4 point bend strength of 250 MPa and an elastic modulus of 88 GPa.

The heat treatment for a tile formed of the above composition was as follows. The tile was charged into a kiln at a nucleation temperature of 560 degrees centigrade and held at this temperature for 1 to 8 hours. The kiln temperature was then increased at 5 degrees centigrade per minute to 874 degrees centigrade and held at this controlled crystallisation temperature for 2 hours, after which the kiln was cooled to room temperature at its natural rate.

EXAMPLE 3

MAGNESIUM ALUMINO SILICATE

This glass had the following composition:

| Glass composition | Wt % |
| --- | --- |
| Magnesium Oxide | 13.1 |
| Aluminium Oxide | 33.2 |
| Silica | 36.5 |
| Zirconia | 17.2 |

This glass was melted using radiant heat at 1650 degrees centigrade. The glass was cast into tiles and then given the following heat treatment. First, it was cooled from the melt temperature to a nucleation temperature of 900 degrees centigrade. This was maintained for a very short or instantaneous interval and the tiles were then introduced into a furnace at 1100 degrees centigrade and held at that temperature for control crystallisation during one hour. They were then cooled at the natural rate of the furnace.

The resulting material had a density of $3.1 \times 10^3$ kg/m$^3$ and a hardness of 1100 Knoop and a 4 point bend strength of 229 MPa and an elastic modulus of 150 GPa.

EXAMPLE 4

CALCIUM MAGNESIUM ALUMINO SILICATE

| Composition of glass | Wt % |
| --- | --- |
| Calcium Oxide | 5.0 |
| Magnesium Oxide | 8.4 |
| Alumina | 26.5 |
| Silica | 48.8 |
| Titanium Dioxide | 11.0 |
| Chromium Oxide | 0.3 |

Heat treatment of the tiles was as follows. They were charged into a kiln at a nucleation temperature of 745 degrees centigrade, at which they were held for 8 hours. Then the temperature was increased at 3 degrees centigrade per minute to a controlled crystallisation temperature of 1150 degrees centigrade, at which they were held for 3 hours. Then the tiles were cooled at the natural rate of the kiln.

The resulting tiles had a density of $2.7 \times 10^3$ kg/m$^3$ and a hardness of 608 Knoop and a 4 point bend strength of 175 MPa and an elastic modulus of 105 GPa.

We have discovered that in the embodiments of the invention the ballistic properties of the glass-ceramic material can be further improved by attention to minimising the presence of seed, stone, and chord. These factors will be discussed in turn.

Seed are fine bubbles of trapped gas which should be refined out from the glass composition and before the heat treatment to promote crystallisation, by maintaining the glass for a period of several hours at a temperature just below its melting point, for example 10 degrees to 100 degrees centigrade below the melting point. In this way, the gas seed are refined out and in the resulting product, the gas seed size should preferably be less than or equal to one quarter of a millimeter in diameter.

As regards maintaining the composition stone free, we have established that it is desirable to minimise the presence of refractory particles coming from the lining of the kiln or furnace, and which lead to lack of homogeneity, and weakness in the product.

As regards the chord free nature of the product, this term refers to compositional variation in the glass and the glass ceramic. We have established that it can be reduced by mechanical stirring of the glass melt, for example by bubbling gas through the melt, or by the use of thermal gradients between electrodes employed to heat the melt.

The glass composition employed for crystallisation in the method of the invention will always include at least minor amounts of seed and stone together with a degree of chord.

Further factors relating to quality control of the glass-ceramic composition include the fact that where transition metals are employed in the glass composition as nucleating agents, it is highly desirable that the ions of these metals should remain in their highest valance state in the melt. Therefore, melting and heat treatment should preferably be carried out under oxidising conditions, such as by use of electromelting with air access, and fossil fuel gases should be avoided as should the presence of organic materials in the kiln linings, since these can produce a reducing atmosphere.

I claim:

1. In an armor material comprising an energy absorptive layer (16); a layer of ceramic material (12); and said layers forming a laminar assembly; the improvement wherein:
    said layer of ceramic material (12) comprises a glass-ceramic composition selected from the group consisting of lithium zinc silicates; lithium zinc alumino silicates; magnesium zinc silicates; calcium magnesium zinc silicates; and zinc alumino silicates; said glass-ceramic composition having a hardness at least 50% less than that of alumina; and
    said glass ceramic composition having been produced by controlled crystallization of the corresponding glass by heat treatment, thereby to promote during use in said armor material, multiple fracture upon impact by a ballistic projectile.

2. An armor material according to claim 1 characterized in that said heat treatment of said corresponding glass comprises:
    (a) maintaining the glass for up to 10 hours at a nucleation temperature determined for the glass by thermal analysis and/or electron microscopy at which temperature nuclei form within the body of the glass;

(b) raising the temperature from the nucleation temperature to a crystallization temperature which is below the temperature for maximum rate of crystal formation by an amount such as to produce a higher density of fine grain crystals than would be obtained at said temperature for maximum rate of crystal formation;

(c) maintaining the temperature at the crystallization temperature for up to 10 hours; and (d) cooling the glass-ceramic at the natural cooling rate of a kiln containing the material, thereby reducing residual stress.

3. An armor material according to claim 1, further characterized in that said glass-ceramic composition includes as microstructure control additives one or more oxides selected from the group consisting of:
$B_2O_3$, $Na_2O$, $K_2O$, $P_2O_5$, $CeO_2$, $TiO_2$, $ZrO_2$, $WO_3$, $Cr_2O_3$, $Fe_2O_3$, $Fe_3O_4$, $As_4O_6$, $Sb_4O_6$, $MO_3$, $BaO$, and $SrO$.

4. An armor material according to claim 1 characterized in that said energy absorptive layer (16) comprises a fiber-reinforced composite material.

5. An armor material according to claim 4 characterized in that said fiber-reinforced composite material comprises high strength fibers incorporated or embedded in a natural or synthetic polymer or resin, or in a laminar assembly of same with other materials.

6. An armor material according to claim 5 characterized in that said high strength fibers comprise glass or carbon fibers.

* * * * *